Oct. 17, 1961 R. PITTMAN 3,004,437
ALL ATTITUDE SINGLE AXIS GYROSCOPIC REFERENCE
Filed March 13, 1958
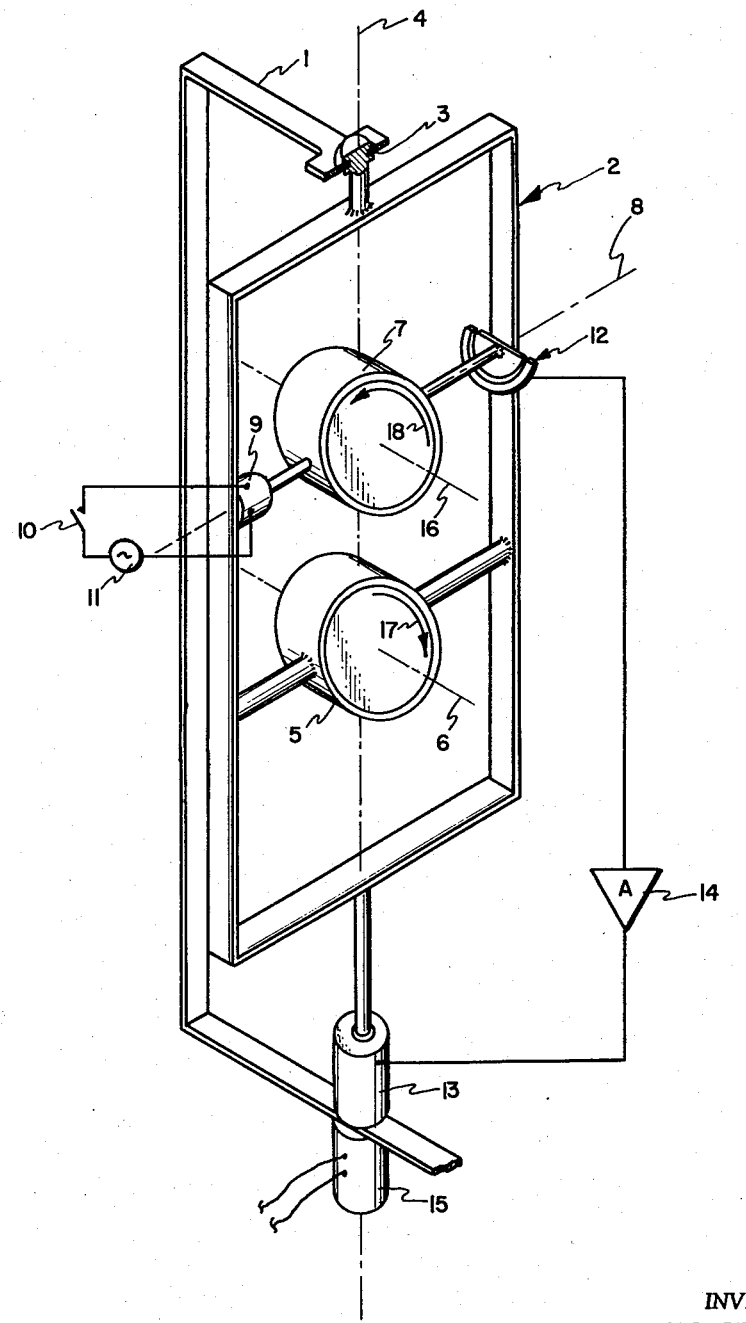
INVENTOR.
ROLAND PITTMAN
BY

United States Patent Office 3,004,437
Patented Oct. 17, 1961

3,004,437
ALL ATTITUDE SINGLE AXIS GYROSCOPIC REFERENCE
Roland Pittman, East Grand Rapids, Mich., assignor to Lear, Incorporated
Filed Mar. 13, 1958, Ser. No. 721,302
5 Claims. (Cl. 74—5.34)

This invention relates to a gyroscopic device and, more particularly, to a single axis displacement gyroscope.

In the past, gyroscopic instruments have been disclosed which have a high degree of accuracy, such as a stabilized platform with three gyroscopes. However, the complexity of such an instrument detracts from its ruggedness. Other gyroscopic instruments have been disclosed which have simplicity and ruggedness of construction, such as a miniature rate gyroscope, in which case, accuracy is sacrificed for simplicity and ruggedness of construction.

Therefore, it is an object of this invention to provide a gyroscopic system having a high degree of accuracy combined with simplicity and ruggedness of construction.

It is a further object of this invention to provide a gyroscopic system having a high degree of accuracy and simplicity and ruggedness of construction for detecting displacement about a single axis.

Still another object of this invention is to provide a gyroscopic system for detecting movement about a single axis wherein the gyroscopic system has a built-in means to keep the displacement gyroscope in an optimum position for detecting movement about the one axis during movement of the system about another axis.

These and other objects will become more apparent from the following description taken in conjunction with the drawing which is a cut-away perspective view of the gyroscopic device.

A preferred embodiment of the invention is illustrated in the drawing for the purpose of exemplification and not of limitation since it is understood that various modifications may be made in the exact arrangement of parts without departing from the spirit and scope of the invention.

Referring to the drawing, there is shown a frame 1 which may be fixed to an outer case (not shown) that completely incloses the gyroscopic device. A rectangular support or gimbal 2 is supported from frame 1 by bearing 3 with angular freedom about the vertical input axis 4 in the figure. A stabilizing gyroscope 5 is supported by the gimbal 2 having its spin axis 6 fixed perpendicular to the input axis 4. A displacement gyroscope 7 having a single degree of angular freedom with respect to the gimbal 2 is mounted on the gimbal 2 such that the precession or output axis 8 of the displacement gyroscope 7 is mutually perpendicular to the input axis 4 and the spin axis 6 of stabilizing gyroscope 5. A torque motor 9 capable of supplying torque to the displacement gyroscope 7 for initially setting the displacement gyroscope 7 is mounted on the gimbal 2 in line with the precession axis 8 and is electrically connected to a manual switch 10 and driven by generator 11. A pickoff means 12 is mounted on the gimbal 2 and is capable of detecting any angular displacement of the displacement gyroscope 7 about its precession axis 8. A torque motor 13 is mounted on the frame 1 in line with the vertical axis 4 in such a manner as to be capable of rotating the gimbal 2 relative to the frame 1. The torque motor 13 also acts as a bearing support for the gimbal 2 and is electrically connected to and driven by a signal from the pickoff means 12 by way of an amplifier 14. A pickoff or resolver 15 is mounted on the frame 1 in line with the input axis 4 for detecting movement of the gimbal 2 and emitting the desired output signal proportional to the angular displacement of the gimbal 2 relative to the frame 1 about vertical axis 4.

It is to be noted that the axis 4 in the figure is the input axis of the displacement gyroscope 7 as well as the input and output axis to the complete unit; whereas axis 8 is the output or precession axis of displacement gyroscope 7.

When mounted on a vehicle, the frame 1 is fixed to the vehicle such that the input axis 4 is positioned parallel to the axis about which angular displacement of the vehicle is to be detected. In its normal position, the spin axis 16 of displacement gyroscope 7 is positioned parallel to the spin axis 6 of the stabilizing gyroscope 5 either by the torque motor 9 for manual positioning or by the torque motor 13 receiving signals from pickoff 12 for initial automatic setting of the displacement gyroscope 7.

When the vehicle rotates about the input axis 4, the gimbal 2 must remain stationary in space in order that the resolver 15 can detect movement of the vehicle relative to the gimbal 2.

However, friction in the bearings supporting the gimbal 2 causes a torque on the gimbal 2 about axis 4. This, in turn, causes displacement gyroscope 7 to precess about its precession axis 8. In this case, the pickoff 12 detects angular movement of displacement gyroscope 7 about axis 8 and emits a signal through amplifier 14 to the torque motor 13 which applies a reversing torque to the gimbal 2 to maintain the displacement gyroscope 7 in its normal position and hold the gimbal 2 in a fixed position in space. The resolver 15 can detect movement of the frame 1 relative to the gimbal 2 which is the desired output of the gyroscopic system.

It is known in the art that angular displacement of the vehicle about axis 6 does not disturb the stabilized position of the gimbal 2 or displacement gyroscope 7.

The stabilizing gyroscope 5, being similar in construction to the displacement gyroscope 7, has approximately the same angular momentum but in an opposite direction because the two gyroscopes are set rotating in opposite directions as indicated by arrows 17 and 18. Angular displacement of the vehicle about axis 8 causes a torque to be exerted on stabilizing gyroscope 5. The stabilizing gyroscope 5 displaces this torque 90 degrees and transmits this torque to the gimbal 2 about axis 4.

In turn, the torque applied to gimbal 2 is transmitted to displacement gyroscope 7 causing displacement gyroscope 7 to precess about axis 8 and maintain its spin axis parallel to the spin axis of the stabilizing gyroscope 5. The pickoff 12 and torque motor 13 compensate for any small differences of angular momentum between the displacement gyroscope 7 and the stabilizing gyroscope 5.

Note that if the stabilizing gyroscope 5 were not present in the system, the torque motor 13 would be required to apply the sufficient torque to the gimbal 2 to cause the displacement gyroscope 7 to rotate about its precession axis 8 to avoid gimbal lock and keep the displacement gyroscope 7 in optimum position to sense angular displacement as the vehicle rotates about axis 8. This action would demand large proportional torques from the torque motor 13 and these torques would only be effected after a build-up or sufficient stand-off of the displacement gyroscope about its precession axis; whereas the stabilizing gyroscope 5 immediately transmits torque to the displacement gyroscope 7 to precess the displacement gyroscope 7 about axis 8 as the vehicle rotates about axis 8. This allows the design of an optimum torque compensation loop wherein the saturated output of the amplifier 14 and the rated gimbal torque output of torque motor 13 are much smaller than those which would be required were the stabilizing gyroscope 5 not in the system.

Since angular rate is sensed by both gyroscopes being of similar size and constructed of similar material, and since the angular momenta are equal but opposite, the output torque of the stabilizing gyroscope 5 is always the proper value to precess the displacement gyroscope 7 at an angular rate equal to the vehicle rate about the precession axis 8. The angular position of the displacement gyroscope 7 with respect to the gimbal 2 is then fixed irrespective of vehicle attitude, angular rate and/or angular acceleration. It is to be noted that this gyroscopic unit can be rotated a full 360 degrees about axis 8 and the unit will give a true output signal throughout the rotation because torque applied as a result of the rotation would never be in a plane perpendicular to the spin axis of the displacement gyroscope 7 due ot the stabilizing gyroscope 5. In other words, the displacement gyroscope will not go into gimbal lock.

The minimized number of degrees of angular freedom provides the simplicity and ruggedness, while the stabilizing gyroscope 5 compensates for large rate torques leaving only small torques to be corrected by a highly sensitive and accurate torque loop.

Although the present invention has been described with a certain degree of particularity, it is understood that various modifications in the details and arrangements of parts may be had without departing from the spirit and scope of the invention as hereinafter claimed.

I claim:

1. Stabilized apparatus comprising a gimbal rotatably supported about a first axis in space, a first gyroscope attached to said gimbal with its spin axis normal to said first axis, a second gyroscope rotatably supported on said gimbal about an axis normal to said first axis, pickoff means producing an electrical signal in response to rotational deviation of said second gyroscope from an orientation in which the spin axes of said gyroscopes are parallel, and torquer means for rotating said gimbal about said first axis in response ot said electrical signal in the sense required to maintain said spin axes parallel.

2. A gyroscopic system responsible to angular displacement of a vehicle about a single input axis, comprising a frame fixed in said vehicle, a gimbal rotatably supported by said frame with angular freedom about said input axis, a first gyroscope having a single degree of angular freedom with respect to said gimbal about an output axis normal to said input axis, a second gyroscope fixed to said gimbal and oriented with an input axis parallel to the input axis of said first gyroscope and a spin axis normal to said input axis, a pickoff means generating a signal in response to relative angular displacement of the spin axes of said two gyroscopes, means torquing said gimbal about said input axis in response to said pickoff signal, and pickoff means generating a signal responsive to the relative angular displacement of said vehicle and said gimbal about said input axis.

3. The device as claimed in claim 2 wherein the said two gyroscopes have substantially equal angular momentum and the said two gyroscopes spin in opposite directions about their respective spin axes.

4. A gyroscopic system responsive to angular displacement of a vehicle about any single input axis comprising a gimbal ring rotatably supported by said vehicle with angular freedom about said input axis, a displacement gyroscope having a single of angular freedom with respect to said gimbal ring about an output axis normal to said input axis and in the plane of said gimbal ring, a stabilizing gyroscope substantially similar in size and shape to said displacement gyroscope and supported by said gimbal ring such that said stabilizing gyroscope has its spin axis fixed perpendicular to the plane of said gimbal ring and said input axis, pickoff means generating an electrical signal in response to angular movement of said displacement gyroscope about said output axis, means torquing said gimbal ring about said input axis in response to said electrical signal and a second pickoff means generating an electrical signal responsive to the relative angular displacement of said vehicle and said gimbal ring about said input axis.

5. A gyroscopic system responsive to angular displacement of a vehicle about any single input axis comprising a frame in said vehicle, a gimbal constituting a rectangular support rotatably supported by said frame with angular freedom about an axis parallel to said input axis, a first gyroscope having a single degree of angular freedom about an output axis normal to said input axis and in the plane of said rectangular support, a second gyroscope supported by said rectangular support wherein the spin axis of said second gyroscope is fixed perpendicular to the plane of said rectangular support, means to drive said first and second gyroscopes about their respective spin axes, means for sensing angular rotation of said first gyroscope about its precession axis, a first torquing means including a torque motor having its stator fixed to said rectangular support and its rotor mechanically linked to said first gyroscope; a signal generator electrically connected to said first torquing means, said first torquing means responsive to a signal from said signal generator for rotating and initially setting said first gyroscope about its precession axis; a second torquing means electrically connected to said sensing means including a torque motor having its stator fixed to said frame with its rotor mechanically connected to said rectangular support such that said second torquing means is capable of rotating said gimbal relative to said frame, and pickoff means generating a signal responsive to the relative angular displacement of said vehicle and said gimbal about said input axis.

References Cited in the file of this patent

UNITED STATES PATENTS

| | | |
|---|---|---|
| 1,253,574 | Carrie | Jan. 15, 1918 |
| 1,253,666 | Carrie | Jan. 15, 1918 |
| 1,446,348 | Hort | Feb. 20, 1923 |
| 1,736,039 | Gray | Nov. 19, 1929 |
| 1,973,042 | Boykow | Sept. 11, 1934 |

UNITED STATES PATENT OFFICE
CERTIFICATE OF CORRECTION

Patent No. 3,004,437           October 17, 1961

Roland Pittman

It is hereby certified that error appears in the above numbered patent requiring correction and that the said Letters Patent should read as corrected below.

Column 4, line 5, after "single" insert -- degree --.

Signed and sealed this 20th day of March 1962.

(SEAL)
Attest:

ERNEST W. SWIDER           DAVID L. LADD
Attesting Officer           Commissioner of Patents